United States Patent
Witte

(10) Patent No.: US 10,409,826 B2
(45) Date of Patent: Sep. 10, 2019

(54) DESCRIPTION BASED MODEL SEARCH

(71) Applicant: Siemens Product Lifecycle Management Software Inc., Plano, TX (US)

(72) Inventor: Martin Witte, Schwabach (DE)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 897 days.

(21) Appl. No.: 14/542,907

(22) Filed: Nov. 17, 2014

(65) Prior Publication Data

US 2016/0140183 A1 May 19, 2016

(51) Int. Cl.
*G06F 16/00* (2019.01)
*G06F 16/2458* (2019.01)
*G06N 7/00* (2006.01)
*G06F 16/36* (2019.01)

(52) U.S. Cl.
CPC .......... *G06F 16/2462* (2019.01); *G06F 16/36* (2019.01); *G06N 7/005* (2013.01)

(58) Field of Classification Search
CPC ...... G06F 16/2462; G06F 16/36; G06N 7/005
See application file for complete search history.

(56) References Cited

U.S. PATENT DOCUMENTS

| | | | |
|---|---|---|---|
| 8,726,232 B1 | 5/2014 | Carrick et al. | |
| 2009/0076998 A1 | 3/2009 | Ocke et al. | |
| 2013/0018651 A1* | 1/2013 | Djordjevic | G06F 17/2765 704/9 |
| 2013/0110498 A1 | 5/2013 | Bekkerman | |
| 2013/0144592 A1* | 6/2013 | Och | G06F 17/28 704/2 |
| 2014/0214841 A1 | 7/2014 | Garera et al. | |

OTHER PUBLICATIONS

EP Search Report dated Mar. 29, 2016, for EP Application No. 15193882.6, 9 pages.
Chen, Hsinchun et al. "A Parallel Computing Approach to Creating Engineering Concept Spaces for Semantic Retrieval: The Illinois Digital Library Initiative Project," IEEE Transaction on Pattern Analysis and Machine Intelligence, vol. 18, No. 8, Aug. 1996, 12 pages.
Ma, Xiaogang et al. "Development of a Controlled Vocabulary for Semantic Interoperability of Mineral Exploration Geodata for Mining Projects," Elsevier, Computers & Geosciences, vol. 36, 2010, pp. 1512-1522, 11 pages.
Spanoudakis, G. et al., "Elaborating Analogies from Conceptual Models." International Journal of Intelligent 11(11), pp. 917-974, 1996 (59 pages).

* cited by examiner

*Primary Examiner* — Paul Kim

(57) ABSTRACT

Methods for product data management and corresponding systems and computer-readable mediums. A method includes receiving a model library comprising a plurality of library objects, identifying a plurality of relevant words and a plurality of word tuples from the description sentences in the plurality of library objects, determining a word frequency for each of the plurality of relevant words in the model library, determining a tuple frequency for each of the plurality of word tuples in the model library, determining a conditional probability for a first relevant word to occur in a description sentence with a second relevant word for each of the plurality of relevant words, and creating a controlled vocabulary for the model library.

18 Claims, 5 Drawing Sheets

| Search: | Library Object | Description Sentence |
|---|---|---|
| | GMGCV3 | external mixed convective exchange with variable signal |

Results:

| # | Description Similarity | Library Object | Description Sentence |
|---|---|---|---|
| 1 | 1.383 | THGCV3 | external mixed convective exchange with variable signal (either velocity or heat exchange coefficient) and thermal port |
| 2 | 1.379 | THGCV1 | external mixed convective exchange with variable signal (either velocity or heat exchange coefficient) |
| 3 | 1.269 | GMGCV2 | external mixed convective exchange with gas-mixture port |
| 4 | 1.014 | TPGCV3 | external mixed convective exchange with variable signal and thermal-pneumatic port |
| 5 | 1.000 | TFGCV3 | external mixed convective exchange with variable signal and thermo-hydraulic port |
| 6 | 0.900 | THGCV4 | external mixed convective exchange with environmental moist air port |
| 7 | 0.842 | THGCV2 | external mixed convective exchange with thermal port |
| 8 | 0.789 | TPGCV2 | external mixed convective exchange with thermo-pneumatic port |
| 9 | 0.776 | THGCV0 | external mixed convective exchange |
| 10 | 0.775 | TFGCV2 | external mixed convective exchange with thermo-hydraulic port |

Figure 3A

| Search: | Library Object | Description Sentence |
|---|---|---|
| | HL000 | simple compressibility hydraulic line (C) |

Results:

| # | Description Similarity | Library Object | Description Sentence |
|---|---|---|---|
| 1 | 1.250 | TFL000 | simple compressibility thermal-hydraulic line (C) |
| 2 | 1.169 | HH000 | simple compressibility hydraulic pipe/hose (C) |
| 3 | 1.115 | HL040 | distributive hydraulic line with lumped elements (C-IR-*-C-IR) |
| 4 | 1.115 | HL041 | distributive hydraulic line with lumped elements (IR-C-*-C-IR) |
| 5 | 1.115 | HL042 | distributive hydraulic line with lumped elements (C-IR-*-IR-C) |
| 6 | 1.088 | TFH00 | simple compressibility thermo-hydraulic pipe/hose (C) |
| 7 | 1.061 | TFL040 | distributive thermal-hydraulic line with lumped elements (C-IR-*-C-IR) |

Figure 3B

DESCRIPTION BASED MODEL SEARCH

CROSS-REFERENCE TO OTHER APPLICATION

This application shares some subject matter with commonly-assigned, concurrently filed U.S. patent application Ser. No. 14/542,954 for "Conceptualization and Search of Block Diagram Based Models", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

Product data management (PDM) systems manage product lifecycle management (PLM) systems and other data. Improved systems are desirable.

SUMMARY OF THE DISCLOSURE

Various disclosed embodiments include methods for product data management and corresponding systems and computer-readable mediums. The method includes receiving a model library comprising a plurality of library objects, identifying a plurality of relevant words and a plurality of word tuples from the description sentences in the plurality of library objects, determining a word frequency for each of the plurality of relevant words in the model library, determining a tuple frequency for each of the plurality of word tuples in the model library, determining a conditional probability for a first relevant word to occur in a description sentence with a second relevant word for each of the plurality of relevant words, and creating a controlled vocabulary for the model library.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 3A and 3B illustrate similar object lists comprising library objects, description sentences, and the respective description similarities in accordance with disclosed embodiments;

DETAILED DESCRIPTION

Figure 1:
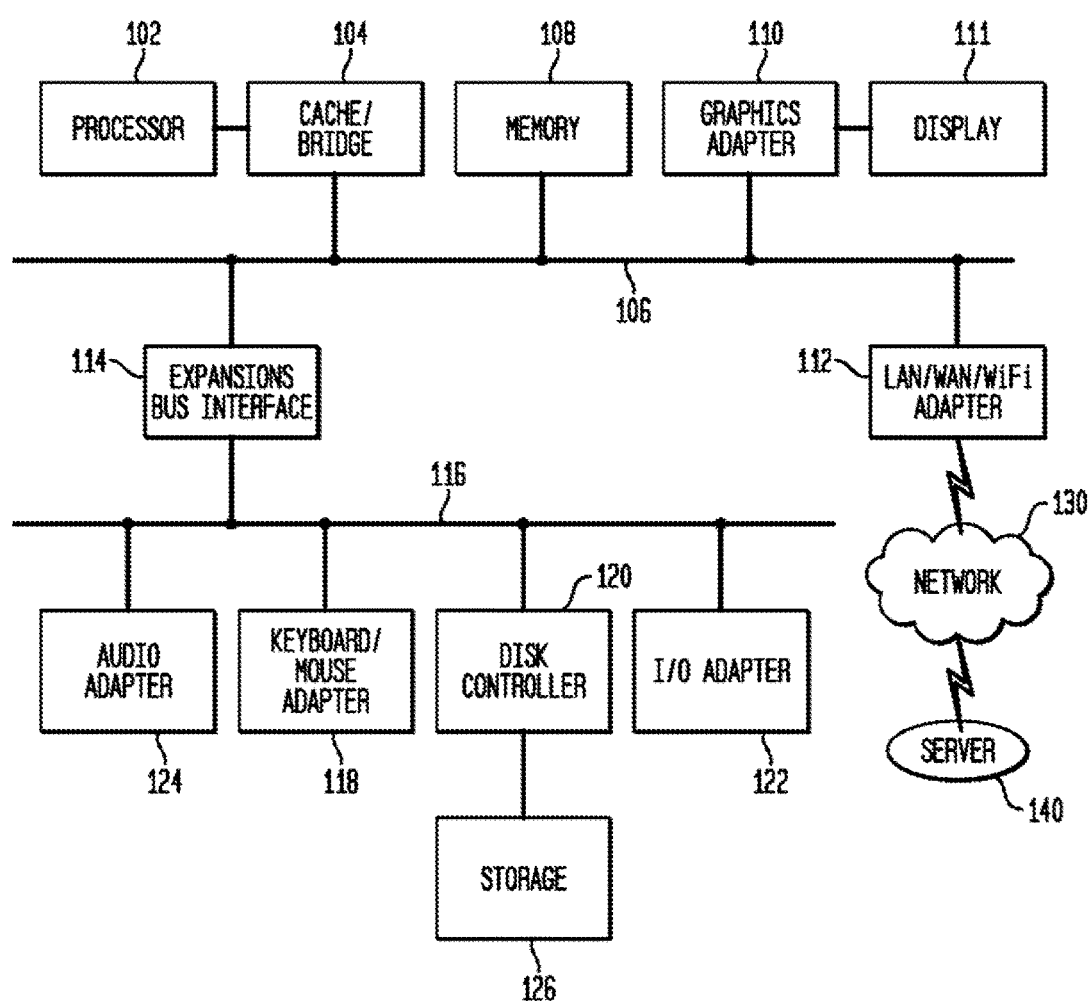
FIG. 1 illustrates a block diagram of a data processing system in which an embodiment can be implemented.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Engineering systems allowing authoring or persisting engineering items to support the textual description of such items, for example, mechanical computer-aided design (MCAD) systems, modeling and simulation systems, or PDM systems. These systems include search engines for text based searches in textual descriptions, often supporting regular expression. Unfortunately, the hit rate of text based searches is often unsatisfactory and relies on good search criteria. On the other hand, semantic searches need a sophisticated engine for analyzing the meaning of a search and the semantic context, such as engineering discipline.

Instead of search techniques using information on typical common expressions in an area without semantic analysis, a probabilistic approach using word combinations is made. No approach of using a managed vocabulary of an engineering area and conditional probabilities of word tuples is known for searching in engineering applications.

A fundamental observation is that similar engineering items should contain similar descriptions, even when created by different authors. Descriptions of engineering items are normally short, concise, and written with deficient grammar. The conciseness stems from a restricted engineering vocabulary, where most terms have well-defined meanings. While the deficiency of grammar in engineering descriptions makes linguistic methods for capturing meaning based on the grammar problematic, a calculation of a description similarity number describing the similarity between textual descriptions sentences without necessity of semantic understanding reduces the amount of problems.

The conditional probability is calculated for two words appearing in a sentence for a given vocabulary. Equation 1 is an example of an equation for calculating a conditional probability, where "p" is the conditional probability, "V" is the vocabulary, and "$v_n$" is a word from the vocabulary.

$$p: V \times V \to [0,1] \subset \mathbb{R}, p(v_1, v_2) = p(v_1 | v_2) \qquad (1)$$

The similarity value is calculated for a set of sentences from vocabulary V. Equation 2 is an example of an equation for calculating the similarity value, where "S" is the similarity value, "$s_n$" is a sentence from the model library, "$v_n \varepsilon s_n$" is a word from the respective sentence being in the vocabulary, and "$n_{f\_i}$" is a normal factor.

$$S: s_i \times s_j \to \mathbb{R}, S(s_1, s_2) = \sum_{v_i \in s_i, v_j \in s_j} \frac{p(v_i, v_j)}{n_{f_k}} \qquad (2)$$

Equations 3, 5 and 6 are examples of normal factors that can be used in equation 2. Equation 3 counts the number of common words in sentence$_1$ and sentence$_2$. Equation 4 defines $\delta(v_i, v_j)$ is equal to one when the number of common words in each sentence are the same and equal to zero when the number of common words in each sentence are not the same. Equation 5 denotes the number of words of sentence$_1$ being in the controlled vocabulary. Equation 6 denotes the product of the respective number of words in the controlled vocabulary for sentence$_1$ and sentence$_2$.

$$n_{f_1} = \sum_{v_i \in s_i, v_j \in s_j} \delta(v_i, v_j) \qquad (3)$$

$$\delta(v_i, v_j) = \begin{cases} 0 & \text{if } i \neq j \\ 1 & \text{if } i = j \end{cases} \qquad (4)$$

$$n_{f_2} = |s_1| \qquad (5)$$

$$n_{f_3} = |s_1| * |s_2| \qquad (6)$$

Equation 7 is used when a mapping of the set of engineering items to sentences exists, where "d" is the textual description, "C" is a set of engineering item, "S" is a collection of sentences, "$c_n$" is a specific engineering item in the set of engineering items, and "$s_n$" is a specific sentence in the collection of sentences.

$$d: C \to S, d(c_1) = s_1 \qquad (7)$$

When equation 7 is used, the description similarity can be calculated with equation 8.

$$S_d: C \times C \to \mathbb{R}, S_d(c_1, c_2) = s(d(c_1), d(c_2)) \qquad (8)$$

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
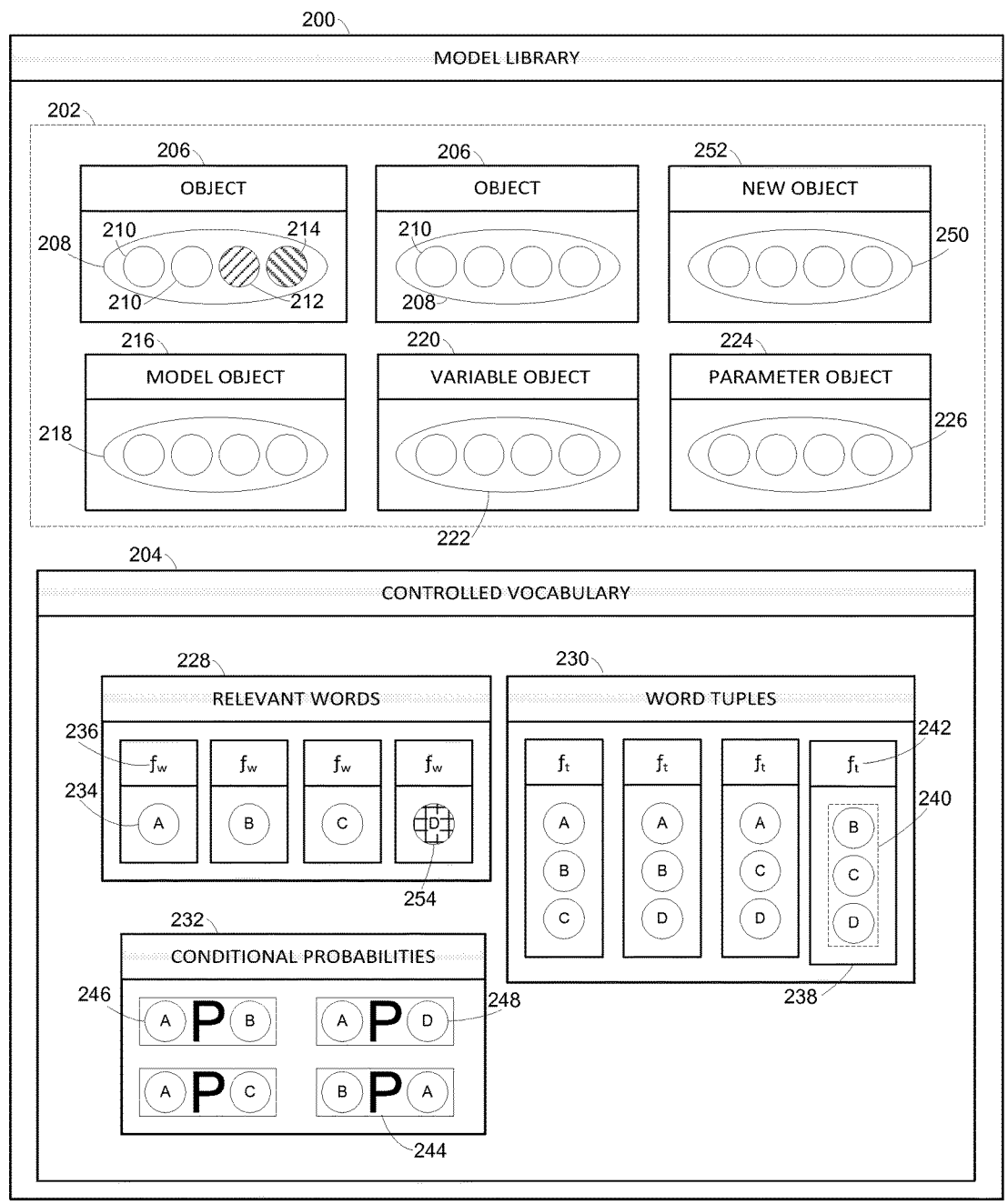
FIG. 2 illustrates a model library comprising a plurality of objects and a controlled vocabulary in accordance with disclosed embodiments.

FIG. 2 illustrates a model library 200 comprising a plurality of library objects 202 and a controlled vocabulary 204 in accordance with disclosed embodiments.

Each library object 206 in the plurality of library objects 202 includes a description sentence 208 configured with description words 210. The description words 210 of the description sentences 208 describe the library objects 206. A portion of the description words 210 are derived words 212 or meaningless words 214. A derived word 212 can be derived from a description word 210 already included in the controlled vocabulary 204. A meaningless word 214 is a word that does not hold significant meaning, for example, a, an, the, them, there, etc. The plurality of library objects 202 includes model objects 216 described by model sentences 218, variable objects 218 described by variable sentences 220, and parameter objects 222 described by parameter sentences 224.

The controlled vocabulary 204 includes a plurality of relevant words 228, a plurality of word tuples 230, and a plurality of conditional probabilities 232. Relevant words 234 are description words 210 that provide textual description of the library object 206, but are not derived words 212 or meaningless words 214. Each relevant word 234 includes a word frequency 236, which is a measurement of the frequency of occurrence for the relevant word 234. In this context, a word tuple 238 is a combination of words found in a single sentence. Word tuples 238 include multiple relevant words 240 and include a tuple frequency 242, which is a measurement of the frequency of occurrence for the word tuples 238. A conditional probability 244 is a measurement whether a first relevant word 246 occurs in a description sentence 208 with a second relevant word 248. The controlled vocabulary 204 limits a new sentence 250 of a new object 252 to the plurality of relevant words 228. A controlled library 204 can include procedures for adding new words 254.

FIGS. 3A and 3B illustrate similar object lists 300 comprising library objects 305, description sentences 310, and the respective description similarities 315 in accordance with disclosed embodiments. A similar objects list 300 provides an amount 320 of results 325 from the search 330 of a selected object 335.

FIG. 3A illustrates a similar object list 300 where the amount 320 of results 325 is limited by a minimum description similarity 340. FIG. 3B illustrates a similar object list 300 where the amount 320 of results 325 is limited by a maximum number 345.

Figure 4:
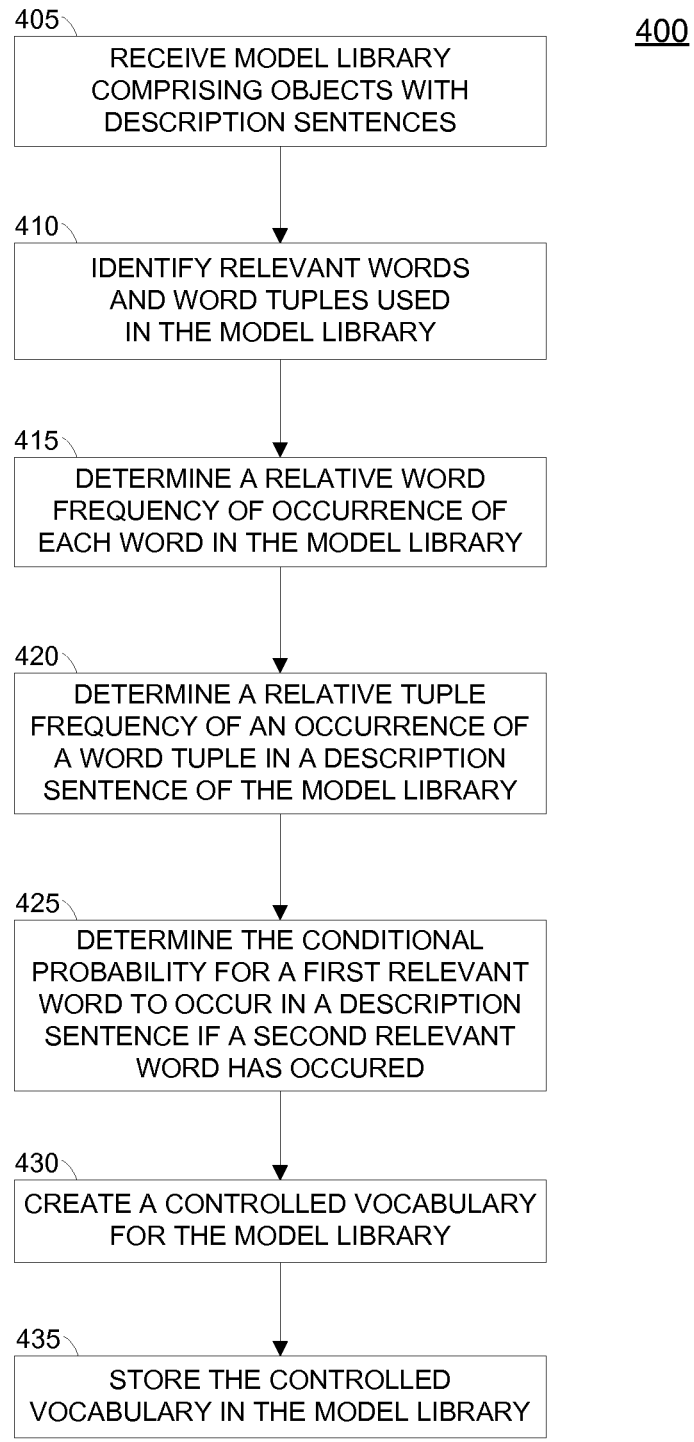
FIG. 4 illustrates a flowchart of a process for creation of a controlled vocabulary in a model library in accordance with disclosed embodiments.

FIG. 4 illustrates a flowchart of a process for creation of a controlled vocabulary in a model library 400 in accordance with disclosed embodiments, for example, by a PLM or PDM system.

In step 405, the system receives a model library comprising a plurality of library objects with descriptions sentence, including, but not limited to, model objects with model sentences, variable objects with variable sentences, and parameter objects with parameter sentences.

In step 410, the system identifies a plurality of relevant words and a plurality of word tuples from the model library. Stemming techniques are used to sort out derived words. The plurality of relevant words is filtered to remove meaningless words, such as, a, the, them, there, etc.

In step 415, the system determines a word frequency for each of the plurality of relevant words in the model library. The frequency of occurrence of each word is relative to the number of descriptions in the model library.

In step 420, the system determines a tuple frequency for a word tuple in a description sentence. The relevant words in the word tuple can appear out of sequence in the description sentence.

In step 425, the system determines a conditional probability for a first word ($word_1$) to occur in a description sentence if a second word ($word_2$) has occurred in the description sentence. In certain embodiments, the conditional probability is determined via an equation, such as:

$$P(word_2 | word_1) := \frac{(\# \text{ usages of } w_2 \text{ in } s \text{ containing } w_1)}{(\# \text{ usages of } w_1)} = \frac{P(w_1 \text{ and } w_2 \text{ in a } s)}{P(w_2)} \quad (9)$$

In equation 9, P is the conditional probability, $w_1$ is the $word_1$, $w_2$ is the $word_2$, and s is a sentence. Small conditional probabilities are removed and considered as a nonfactor in the determination. In some embodiments, removing the conditional probabilities reduces the number of relevant objects by a factor of 100.

In step 430, the system creates a controlled vocabulary for use with the model library. The controlled vocabulary manages the relevant words in the model library for describing new artifacts or adding new components to the model library. Enlargement of the controlled vocabulary can be managed when new relevant words are added. The controlled vocabulary stores the conditional probabilities of the word tuples, enabling the calculation of the similarity of sentences without semantic analysis providing improved search functionality based on descriptions.

In step 435, the system stores the controlled vocabulary in the model library.

Figure 5:
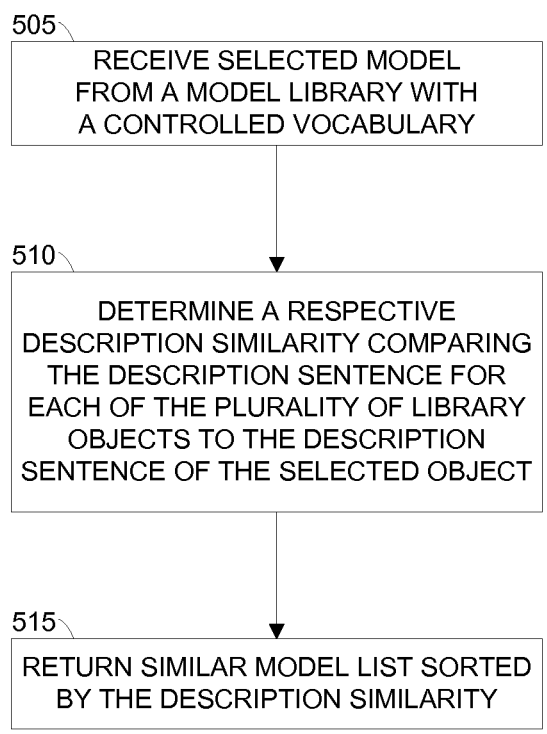
FIG. 5 illustrates a flowchart of a process for a similarity search for similar descriptions in a model library with a controlled vocabulary in accordance with disclosed embodiments.

FIG. 5 illustrates a flowchart of a process for a similarity search 500 for similar descriptions in a model library with a controlled vocabulary in accordance with disclosed embodiments, for example, by a PLM or PDM system.

In step 505, the system receives a selected object in a model library with a controlled library. The selected object exists in a model library with a controlled vocabulary and comprises description sentences. A user can select a library object in the model library as the selected object.

In step 510, the system determines a respective description similarity comparing the description sentence for each of the plurality of library objects to the description sentence of the select object. In certain embodiments, the respective description similarity can be determined via an equation, such as:

$$S(s_1, s_2) := \frac{\Sigma(P(i,j) * \Delta(i,j))}{\Sigma \Delta(i,j)} \quad (10)$$

In equation 10, S is the description similarity, $s_1$ is a description sentence of the selected component, $s_2$ is a description sentence of a library object, P is the probability of two relevant words and s is a sentence.

In step 515, the system returns a similar model list including the plurality of library objects, the description sentences, and the respective description similarities. Library objects with a low description similarity are removed and considered as a nonfactor in the determination. The number of library objects included in the list can be a defined number, a minimum description similarity, or any other method or combination of methods of determining an amount of library objects to include in the list. The plurality of library objects is sorted by the respective description similarity.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for description based model searching performed by a data processing system and comprising:
   receiving a model library comprising a plurality of library objects, wherein each of the plurality of library objects comprises a description sentence;
   identifying a plurality of relevant words and a plurality of word tuples from the description sentences in the plurality of library objects, where each of the plurality of word tuples comprises multiple relevant words;
   determining a word frequency for each of the plurality of relevant words in the model library;
   determining a tuple frequency for each of the plurality of word tuples in the model library;
   determining a conditional probability for each combination of pairs of relevant words in the plurality of relevant words within the description sentence for each of the plurality of library objects, wherein the conditional probability is a measurement of whether a first relevant word occurs in a description sentence with a second relevant word;
   creating a controlled vocabulary for the model library comprising the plurality of relevant words, the word frequency for each of the plurality of relevant words, the plurality of word tuples, the tuple frequency for each of the plurality of word tuples, and the conditional probabilities for each of the plurality of relevant words;
   receiving a new object with a new description sentence to be added in the model library with the controlled vocabulary;
   altering, based on the conditional probabilities in the calculated controlled vocabulary, the new description sentence based on the plurality of relevant words; and
   adding the new object with the altered new description sentence to the model library.

2. The method of claim 1, wherein an amount of the plurality of library objects contained in the similar objects list is limited by both a maximum number and a minimum description similarity.

3. The method of claim 1, wherein the description sentences include model sentences, variable sentences and parameter sentences.

4. The method of claim 1, wherein identifying a plurality of relevant words comprises:
   using stemming techniques to sort out derived words; and
   filtering meaningless words out of the plurality of relevant words.

5. The method of claim 1, wherein determining a tuple frequency includes the multiple relevant words in different orders.

6. The method of claim 1, wherein the controlled vocabulary limits the description sentence of a new object to the plurality of relevant words.

7. A data processing system for description based model searching comprising:
   a hardware processor; and
   an accessible memory, the data processing system particularly configured to:
   receive a model library comprising a plurality of library objects, wherein each of the plurality of library objects comprises a description sentence;
   identify a plurality of relevant words and a plurality of word tuples from the description sentences in the plurality of library objects, where each of the plurality of word tuples comprises multiple relevant words;
   determine a word frequency for each of the plurality of relevant words in the model library;
   determine a tuple frequency for each of the plurality of word tuples in the model library;
   determine a conditional probability for each combination of pairs of relevant words in the plurality of relevant words within the description sentence for each of the plurality of library objects, wherein the conditional probability is a measurement of whether a first relevant word occurs in a description sentence with a second relevant word;
   create a controlled vocabulary for the model library comprising the plurality of relevant words, the word frequency for each of the plurality of relevant words, the plurality of word tuples, the tuple frequency for each of the plurality of word tuples, and the conditional probabilities for each of the plurality of relevant words;
   receive a new object with a new description sentence to be added in the model library with the controlled vocabulary;

alter, based on the conditional probabilities in the calculated controlled vocabulary, the new description sentence based on the plurality of relevant words; and add the new object with the altered new description to the model library.

8. The data processing system of claim 7, wherein an amount of the plurality of library objects contained in the similar objects list is limited by both a maximum number and a minimum description similarity.

9. The data processing system of claim 7, wherein the description sentences include model sentences, variable sentences and parameter sentences.

10. The data processing system of claim 7, wherein to identify a plurality of relevant words comprises:
use stemming techniques to sort out derived words; and
filter meaningless words out of the plurality of relevant words.

11. The data processing system of claim 7, wherein to determine a tuple frequency includes the multiple relevant words in different orders.

12. The data processing system of claim 7, wherein the controlled vocabulary limits the description sentence of a new object to the plurality of relevant words.

13. A non-transitory computer-readable medium encoded with executable instructions that, when executed by at least one processor, cause the at least one processor to carry out a method for description based model searching comprising:
receiving a model library comprising a plurality of library objects, wherein each of the plurality of library objects comprises a description sentence;
identifying a plurality of relevant words and a plurality of word tuples from the description sentences in the plurality of library objects, where each of the plurality of word tuples comprises multiple relevant words;
determining a word frequency for each of the plurality of relevant words in the model library;
determining a tuple frequency for each of the plurality of word tuples in the model library;
determining a conditional probability for each combination of pairs of relevant words in the plurality of relevant words within the description sentence for each of the plurality of library objects, wherein the description sentence for each of the plurality of library objects, wherein the conditional probability is a measurement of whether a first relevant word occurs in a description sentence with a second relevant word;
creating a controlled vocabulary for the model library comprising the plurality of relevant words, the word frequency for each of the plurality of relevant words, the plurality of word tuples, the tuple frequency for each of the plurality of word tuples, and the conditional probabilities for each of the plurality of relevant words;
receiving a new object with a new description sentence to be added in the model library with the controlled vocabulary;
altering, based on the conditional probabilities in the calculated controlled vocabulary, the new description sentence based on the plurality of relevant words; and
adding the new object with the altered new description to the model library.

14. The computer-readable medium of claim 13, wherein an amount of the plurality of library objects contained in the similar objects list is limited by both a maximum number and a minimum description similarity.

15. The computer-readable medium of claim 13, wherein the description sentences include model sentences, variable sentences and parameter sentences.

16. The computer-readable medium of claim 13, wherein identifying a plurality of relevant words comprises:
using techniques to sort out derived words; and
filtering meaningless words out of the plurality of relevant words.

17. The computer-readable medium of claim 13, wherein determining a tuple frequency includes the multiple relevant words in different orders.

18. The method of claim 1, further comprising:
operating a product data management system using the model library with the similar objects list.

* * * * *